Patented Feb. 5, 1946

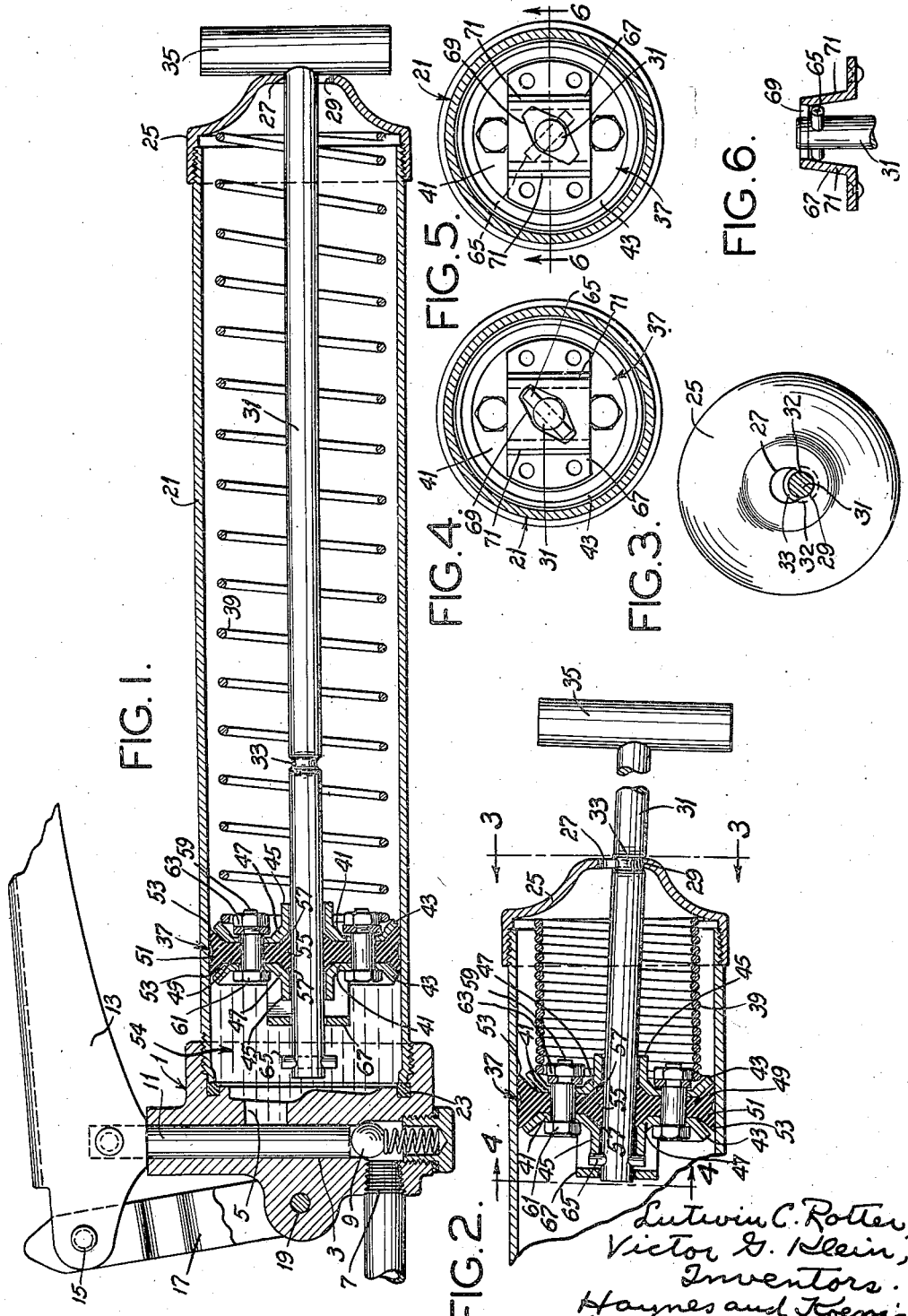

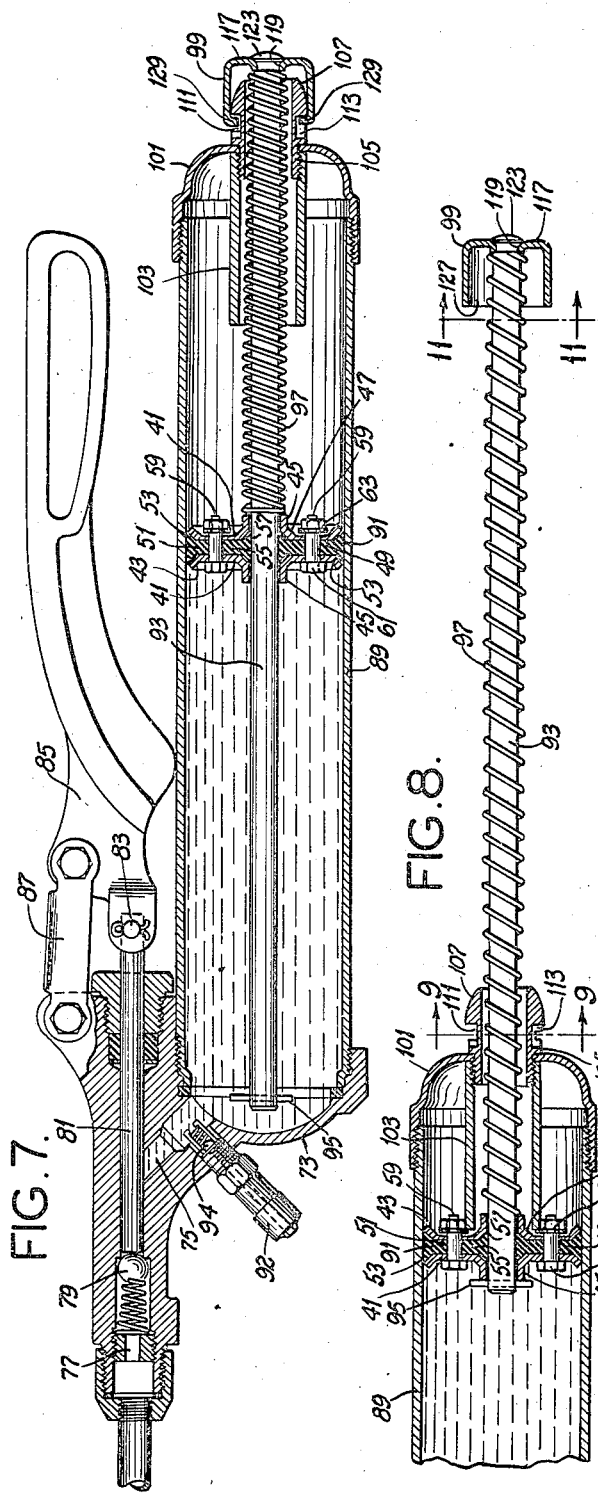

2,394,488

UNITED STATES PATENT OFFICE 2,394,488

LUBRICATING APPARATUS

Lutwin C. Rotter, Maplewood, and Victor G. Klein, St. Louis, Mo., assignors to Lincoln Engineering Company, St. Louis, Mo., a corporation of Missouri Application May 7, 1943, Serial No. 485,966

8 Claims. (Cl. 222—340)

This invention relates to lubricating apparatus, and more specifically to hand-operated, lever-type apparatus of this class.

Among the several objects of the invention may be noted the provision of improved priming and filling means for lubricant pumps which may be operated with great facility under adverse field conditions and which is economical and reliable. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a longitudinal section of a lubricant supply cylinder of one form of lever gun;

Fig. 2 is a fragmentary view similar to the right end of Fig. 1 but showing an alternate position of parts;

Figs. 3 and 4 are vertical sections taken on line 3—3 and 4—4 respectively of Fig. 2;

Fig. 5 is a view similar to Fig. 4 showing different positions of parts;

Fig. 6 is a fragmentary section taken on line 6—6 of Fig. 5;

Fig. 7 is a view similar to Fig. 1 showing another embodiment;

Fig. 8 is a fragmentary view similar to Fig. 7 but showing a different position of parts.

Fig. 9 is a cross section taken on line 9—9 of Fig. 8;

Fig. 10 is a perspective view of the part shown in Fig. 9;

Fig. 11 is a vertical section taken on line 11—11 of Fig. 8 but on an enlarged scale;

Fig. 12 is a view similar to Fig. 11 but is a rear view of a catch member shown in Fig. 11; and, Fig. 13 is a section taken on line 13—13 of Fig. 11 but much enlarged.

Similar reference characters indicate corresponding parts throughout the several views of the drawings.

Referring now more particularly to Fig. 1, there is shown at numeral 1 a head in which is a bore 3 having an inlet 5 and an outlet 7. Ahead of the outlet 7 is an outlet check valve 9. A reciprocating plunger is shown at 11 pinned to a handle 13 for reciprocating the plunger 11 across the inlet port 5, to allow entrance to and to compress the material out of the outlet and the check valve 9. The end of the handle 13 is pinned at 15 to a bridle link 17 which in turn is pinned at 19 to the head 1.

A lubricant supply is carried in a removable cylinder 21 threaded into the head 1 and packed at 23. The cylinder 21 carries at its rear end a permanent head 25 in which is a circular opening 27, notched sidewise as indicated at 29 (Figs. 1, 2 and 3) to provide a keyhole opening. Passing through the opening 27 is a sliding piston rod 31 grooved as shown at 33 for hanging engagement with the notch 29 when said groove is drawn back to the opening 27 and moved sidewise. The groove 33 has its edges rounded so that the lips 57 are not spoiled by passage thereover. The passage between opening 27 and notch 29 is slightly larger than the minimum diameter of the groove 33, small cusps 32 being left for this purpose. These cusps have the effect of locking the rod 31 against becoming coaxial due to expansive action of the spring 39. It will be understood that, despite this rounding, the cusps 32 and hanging action of the groove 33 in the notch 29 hold the rod in angled position, since the tendency is small for the compressed spring 39 to angle the piston 37 to a perpendicular plane in cylinder 21. Also, the piston to be described also has very little tendency to angle the piston 37 to said perpendicular plane. The rod 31 carries an operating handle 35 at its outer end.

At its inner end, the rod 31 is slidable through a piston indicated generically at 37, this piston being normally biased toward the head 1 by means of an internal compression spring 39.

The piston 37 incorporates novel features illustrated by Figs. 1, 2, 4 and 5. It comprises two oppositely cupped, plate-like heads 41 having outwardly bevelled rims 43 and outwardly directed sleeves 45, the latter for loose slidable cooperation with said control rod 31. Bevelled portions 47 join the sleeves 45 with the respective plates to make a cupped form.

Between the heads 41 is located a rubber packing diaphragm 49 made preferably of one of the artificial rubbers which will withstand attack from grease, lubricants and the like. A typical resilient rubber material is "neoprene." The diaphragm 49 is provided with a rim 51 of forked section providing feather edges 53 and a sleeve-like inner part 55 providing inner feather edges 57. The feather edges 53 contact the inside of the cylinder 21 and edges 57 contact the rod 31.

Opposite openings in the heads 41 and openings in the diaphragm 49 accommodate bolts or studs 59 which have heads 61 outside one of the plates 41, and have nut-and-washer combinations 63 outside the other plate 41. The distance between the inside of a head 61 and the inside of the washer under the opposite nut is greater than the sum of thicknesses of the diaphragms 49 and plates 41. Also, the studs are somewhat smaller than the openings through the plates 41, although they are snugly engaged by the openings in the diaphragm. Thus, the parts 41, 51 and 59 are loosely assembled. But the plates 41 and diaphragm 53 are pushed together either by action of the compression spring 39 on one plate and the reaction of lubricant 54 on the other plate; or by the action of a pin 65 on the end of the rod 31 when the latter is drawn back, as will be described.

The plate 41 which is on the lubricant side of the piston has welded to it a bridge or saddle member 67 in the face of which is an elongate opening 69 of the form shown in Figs. 4 and 5. The ends of this opening are adjacent to the side walls 71 of the saddle, with the plane of which the opening is angular (preferably at 45°). The opening 69 is long enough to accommodate the pin 65 if the pin 65 is rotated into the correct co-planar position as shown in Fig. 4. By turning the handle 35 counterclockwise, this rotation is accomplished, and the ends of the pin 65 at the proper point effect contact with the walls 71 to assure alignment of the pin 65 with the opening 69. Hence if the rod 31 is thrust forward as shown in Fig. 1, the pin 65 will pass out through the opening as shown in Fig. 4. Retraction sends pin 65 back through the opening when properly aligned. If on the other hand, the pin 65 is withdrawn into the opening under the saddle 67, and rotated counterclockwise through ninety degrees, its ends will again strike the walls 71 as shown in Fig. 5 and a push forward will then cause the rod 31 to force the piston 37 forward.

Operation is as follows: The pump is shown near its empty condition in Fig. 1. To refill the cylinder 21 it may be unscrewed from the head 1. Then, the rod 31 may be drawn back by pulling on the handle 35 so as to bring the groove 33 into openings 29. Lateral movement of the rods 31 will then hook the groove 33 into the notch 29. It may at this time be assumed that the pin 65 has properly been withdrawn into the slot 69 and then moved to the angular position shown in Fig. 5.

It should be noted that angling of the rod 31 causes a substantial angling of the piston 37 in the cylinder 21. It is for this purpose that the loose organization is arranged between the plate 41, diaphragm 49 and studs 59. This allows relative movement between piston parts and avoids breaking the seals at the lips 53 and 57.

The parts when in the condition shown in Fig. 2 are ready for infilling of lubricant into the cylinder 21, after which the cylinder may be screwed back on the base 1. Then the rod 31 is pushed sidewise which releases the spring 39 for expansion. The expansion of the spring 39 pushes the piston against the contained lubricant toward the inlet 5 thus priming the pump inlet 5. Since it pushes on one plate 41 and the other plate 41 is against the lubricant, the piston parts 41 and 49 compress together being aligned by bolts 59.

If it is desired manually to augment the priming by spring 39, this may be done by pushing upon the handle 35 when the pin 65 is in the position shown in Fig. 5. Thereafter, the handle 35 may be twisted to bring the pin 65 into the position shown in Fig. 4. The stop action of the walls 71 on the ends of the pin 65 properly aligns the pin with the opening 69, after which the rod 31 may be pushed on through the piston and the handle 35 brought up against the head 25, where it remains. Thus the rod 31 is housed in the cylinder 21. The amount of lubricant displaced by pushing in the rod simply pushes back the piston 37 a small amount against the compression of spring 39. After this, the spring 39 advances the piston as lubricant is withdrawn by the pump.

In Fig. 7 is shown another application of the invention in which numeral 73 designates the pump head, 75 the inlet, 77 the outlet and 79 the outlet check valve. Numeral 81 indicates the plunger pinned at 83 to the operating handle 85 which is linked to the head member 73 through a bridle link 87. The cylinder in this case is numbered 89, the piston 91. At 92 is a filling inlet having an inlet check valve therein, part of the latter being shown at 94. This inlet allows for filling without (if desired) removing cylinder 89, by coupling 92 to a filling nozzle (not shown).

The piston 91 is built similarly to the piston 37 of Figs. 1 and 2, except that it does not have the bridge member 67. Instead, the control rod 93 passes through the piston without any bridge and is supplied at its inner end with a cross key 95 which when the rod 93 is drawn back simply contacts the lubricant side of the piston 91.

Carried on rod 93 behind the piston 91 is a spring 97 which reacts from the inside of a cupped head 99 on said rod. The assembly of spring 97 and rod 93 passes through a head 101 of the cylinder 89 via a guide cylinder and stop 103. The cylinder 103 is held to the head 101 by a threaded tubular bushing 105 which is shown in detail in Figures 9 and 10. The rod 93 and spring 97 pass loosely through the bushing 105. This bushing is exteriorly tapered as shown at 107, the taper having opposite parallel flat sides 109. Beyond the tapered portions 107 is a peripheral groove 111 on opposite sides of which are drilled recesses 113. The diameters of the recesses are larger than the width of the groove 111. The recesses are located at 90° with respect to the flats 109.

Referring to the cup 99, it comprises a bottom 117 which has a flanged opening 119 wherein are recesses 121 for receiving a rivet extension 123 of the rod 93. Swaging and spinning cause the rivet 123 to take the form shown in Fig. 13 wherein the swaged part 125 sinks into the recesses 121 to hold the head 99 rigidly on the rod 93. The other end of the cup 99 is open, as shown at 127 where it is provided with inwardly extending tongues 129. These tongues 129 are adapted to pass over the flats 109 of bushing 105, and upon a ninety degree rotation of the head 99 (and rod 93) enter the recesses 113. Thereafter, expansion of the spring 97 is allowed to seat the tongues 129 in the recesses to hold the assembly as shown in Fig. 7.

To draw back the piston for refilling, as shown in Fig. 8 the head 99 needs only to be rotated ninety degrees and the assembly of rod 93, 97 drawn back, whereupon the cross-key 95 engages the piston 91 to draw it back. After refilling, the rod 93 may be pushed in, whereupon the spring 97 compresses as shown in Fig. 7. When the head 99 passes over the end of the bushing 105, it may be rotated back into the ninety degree position wherein the ears 129 act as catches in the radial recesses 113.

Advantages of the catch described between head 99 and bushing 105 are that it is simple to make the connection when desired without nicety of operation, as for example would be the case if threads or an ordinary bayonet catch were used at this point. It is quite difficult to pick up a thread without crossing it under the conditions of reactive force exerted by the spring 97, especially in hand-supported apparatus. In addition, since the sides of the drilled recesses 113 are rounded notches, a disconnection may be made quite easily, that is, simply by rotating the head 99. The rounded notches act as cams which cam out the tongues 129. As soon as the tongues 129 reach the flats 109 the spring pushes out the rod 93. Thus the catch arrangement shown in Figs. 7, 8, 9 and 10 is a particularly simple one to make and at the same time lends itself to quick manipulation without the operator becoming entangled in any delicate moves. In addition it is strong. All of this is particularly useful in miltary applications of the invention for which it has been particularly designed. For example, despite the looseness of the rod 93, any push on cup 99 guides the tongues 129 over the taper 107, and a quick rotation either way of less than 180° finds the flats 109 by the tongues 129. At this juncture a continued axial push sends the tongues 129 against the bottom of groove 111. The push is automatically limited and there can be no mistake. Finally a 90° rotation either way causes spring 97 to push the tongues 129 into the notches formed by openings 113 in the other side of the groove. Unlike an ordinary bayonet catch or screw thread, choice of direction of rotation is optional, and there can be no confusion due to a wrong choice in this respect.

In this form of the invention there is quite a loose arrangement between the assembly of rod 93 and spring 97 within the opening 115 of the nut 105 which allows substantial angling of the rod, but the loosely organized form of piston described, with loose plate and diaphragm parts allows, for this lateral angling without spoiling the piston or the seal.

The flange 119 around the opening in the cup 99 assures accurate axial positioning of the cup on the rod 93, particularly inasmuch as the outer part of the opening through 119 is bevelled and provided with the recesses 121 which when the deforming riveting operation occurs brings about said axial alignment besides preventing relative turning.

In view of the above, it will be seen that the several objects of the invention are achieved and other advantageous results attained.

As many changes could be made in the above constructions without departing from the scope of the invention, it is intended that all matter contained in the above description or shown in accompanying drawings shall be interpreted as illustrative and not in a limiting sense.

We claim:

1. In apparatus of the class described, a piston comprising a resilient diaphragm, a pair of oppositely directed outside axial sealing edges on the diaphragm and another pair of oppositely directed inside axial sealing edges, holding plates on opposite sides of said diaphragm bevelled on their outside edges to accommodate said outside sealing edges and bevelled inwardly to accommodate said inside sealing edges, adjacent openings in the diaphragm and said plate, and holding bolts passing loosely through the openings in the plate but snugly engaged by the openings in the diaphragm.

2. In apparatus of the class described, a piston comprising a resilient diaphragm, a pair of oppositely directed outside axial sealing edges on the diaphragm and another pair of oppositely directed inside axial sealing edges, holding plates on opposite sides of said diaphragm bevelled on their outside edges to accommodate said outside sealing edges and bevelled inwardly to accommodate said inside sealing edges, adjacent openings in the diaphragm and said plate, and holding bolts passing loosely through the openings in the plate but snugly engaged by the openings in the diaphragm, said holding bolts being of such length that the plates and diaphragm are loosely organized.

3. A piston having an opening therethrough, a bridge on the piston providing space thereunder adjacent the piston, said bridge having lateral walls, an opening in the bridge extending angularly between said walls and accommodating a cross member in one angular position but not in another, said cross member being accommodated between said walls but the walls limiting angular motion thereof either to a position for its passage through said opening or to a position where passage through said opening is not accommodated.

4. A piston having an opening therethrough for axial movement of a rod carrying a cross pin, a bridge on the piston providing space thereunder adjacent the piston, said bridge having lateral walls, an opening extending angularly between said walls and accommodating said pin on the rod in one angular position of the rod but not in another position thereof, said pin on the rod being accommodated between said walls but the walls limiting angular motion thereof either to a position for passage through said opening or to a position where passage through said opening is not accommodated.

5. A piston for slidably sealing against a cylinder and a coaxial rod, comprising spaced annular plates, a resilient sealing diaphragm sandwiched between said plates, outwardly enlarged edges upon the peripheries of said diaphragm adjacent the cylinder and also adjacent the rod providing a pair of acute-angled sealing edges at each periphery, conical bevelled portions on the plates directed from one another located adjacent the cylinder and the rod and adapted movably to accommodate said enlarged edges of the peripheries to allow for effective sealing under pressure, and axially directed cylindric portions extending from said plates and sliding with respect to the rod, the outer edges of said plates being spaced from the cylinder.

6. A piston for slidably sealing against a cylinder and a coaxial rod, comprising spaced plates, a resilient sealing diaphragm sandwiched between said plates, outwardly enlarged edges upon said diaphragm adjacent the cylinder and also adjacent the rod providing a pair of acute-angled sealing edges at each periphery, bevelled portions on the plates directed from one another located adjacent the cylinder and the rod and adapted movably to accommodate said enlarged edges of the peripheries to allow for effective sealing, axially directed cylindric portions extending from said plates and sliding with respect to the rod, the outer edges of said plates being spaced from the cylinder, and bolts loosely holding together said plates and the diaphragm.

7. A piston for slidably sealing against a cylinder and a substantially coaxial rod, comprising spaced plates, a resilient sealing diaphragm sandwiched between said plates, axially enlarged edges upon said diaphragm adjacent the cylinder and also adjacent the rod providing a pair of oppositely directed edges at each periphery, bevelled portions on the plates directed from one another located adjacent the cylinder and the rod and adapted movably to accommodate said enlarged peripheral edges to allow for effective sealing, axially directed cylindric portions extending from said plates and sliding with respect to the rod, the outer edges of said plates being spaced from the cylinder, and studs loosely holding together said plates and the diaphragm.

8. A lubricant supply compartment for lubricant pumps and the like, comprising a cylinder having a filling opening at one end and an enclosing head at the other end, a control rod longitudinally movable in the cylinder, said enclosing head having a keyhole opening with a circular part and a notched part, said rod fitting the circular part for sliding but being too large for the notched part, said rod including a peripheral reduced portion fitting said notched part, a piston slidable both on the rod and in the cylinder, said piston being adapted to seal against the rod and the cylinder when coaxial and when angled to the degree required by movement into said notch of the reduced portion on the rod, a spring reacting between the piston and said enclosing head, and manually operable locking means between said enclosing head and the rod adapted to resist the tendency of the spring pressure on the piston to coalign the rod with the cylinder when the reduced portion is in the notch but allowing said coalignment to be effected manually.

LUTWIN C. ROTTER.
VICTOR G. KLEIN.